No. 787,193. PATENTED APR. 11, 1905.
O. O. KRUH.
FREQUENCY CHANGER.
APPLICATION FILED DEC. 12, 1903. RENEWED SEPT. 1, 1904.
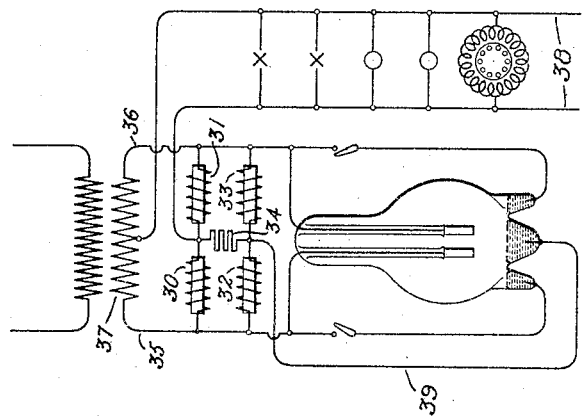
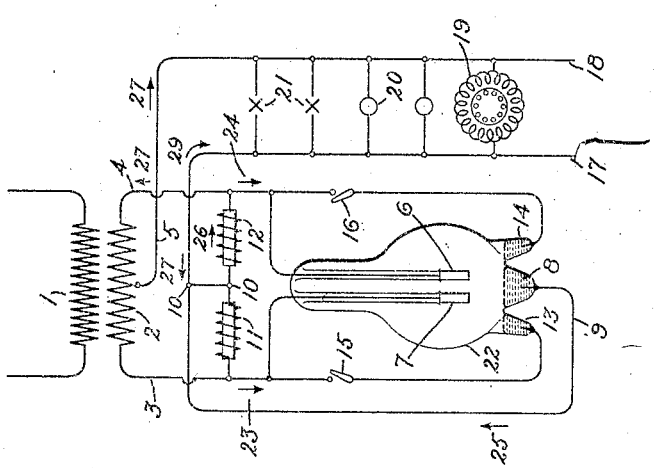
Witnesses:
George H. Tilden.
Allen Axford
Inventor:
Osias Otto Kruh.
by Albert G. Davis
Att'y.

No. 787,193. Patented April 11, 1905.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

FREQUENCY-CHANGER.

SPECIFICATION forming part of Letters Patent No. 787,193, dated April 11, 1905.

Application filed December 12, 1903. Renewed September 1, 1904. Serial No. 223,003.

*To all whom it may concern:*

Be it known that I, OSIAS OTTO KRUH, a subject of the Emperor of Austria-Hungary, residing at Schenectady, in the county of Schenectady and State of New York, have invented certain new and useful Improvements in Frequency-Changers, of which the following is a specification.

My invention relates to the transformation of an alternating current of a given frequency into an alternating current of a different frequency.

In carrying out my invention in practice I make use of energy-storing devices arranged in coöperative relation with a vapor-conductor. By the term "vapor-conductor" I mean to imply the use of an exhausted envelop provided with electrodes, one, at least, of which is adapted to emit vapor. When this vapor is given off through the action of an electric current, the vapor provides a conducting-path for the current. Hence the term "vapor-conductor." A vapor-conductor when connected to a source of alternating current operates selectively upon current-waves flowing therein in such a manner as to cause the current flowing into or out of any particular electrode always to be in the same direction. By associating such a vapor-conductor with energy-storing devices I have produced an organization such that the selective action of the vapor-conductor so controls the storing and restoring of energy of the energy-storing devices as to produce in one of the circuits of the system an alternating current the frequency of which is double that of the original source of alternating current.

The novel features which I believe to be characteristic of my invention I have pointed out with particularity in the claims appended hereto. The invention itself, however, both as to the details of its organization and its mode of operation, will be better understood by reference to the following description taken in connection with the accompanying drawings, in which—

Figure 1 represents one embodiment of my invention, and Fig. 2 a modification.

In the drawings, the alternating current the frequency of which is to be transformed is supplied to the primary 1 of a transformer of any desired ratio of transformation. The secondary of the transformer is indicated at 2 and is provided with leads 3 and 4, extending from the terminals thereof, and a lead 5, extending from its middle point. The leads 3 and 4 are connected, as indicated, to the main electrodes 6 7 of a vapor-conductor. These electrodes constitute anodes and coöperate with a third main electrode or cathode 8. The cathode 8 is of mercury or some other suitable vaporizable material, while the coöperating anodes 6 and 7 may, if desired, also be of mercury, although it is preferable, as represented in the present instance, that they should be formed of some non-vaporizable material, such as carbon, artificial graphite, or the like.

The cathode 8 is connected, through a suitable leading-in conductor, with a lead 9, connecting with the junction 10 between two inductance-coils 11 and 12, connected in series across the mains 3 and 4. Two supplemental starting-electrodes 13 and 14 are also connected to the main supply-leads 3 and 4, one electrode for one lead and the other electrode for the other lead. After the apparatus has been started in a manner hereinafter to be described these starting-electrodes may be cut out of circuit by means of switches 15 and 16, though, if desired, they may in some instances be used to the exclusion of the non-vaporizable electrodes 6 and 7. In the latter case the electrodes 6 and 7 may be left unconnected or, if desired, entirely omitted from the apparatus.

The circuit which is to receive the alternating current of altered frequency is represented by the mains 17 and 18, between which translating devices of any desired character may be connected. Various forms of translating devices are indicated conventionally— an alternating-current motor at 19 and different forms of lamps at 20 and 21. The mains of this consumption-circuit are connected the one to the lead 5, tapped into the middle of the secondary 2, and the other to the junction 10, between the inductance-coils 11 and 12.

To start the apparatus into operation, the exhausted receptacle 22 may be tipped or shaken, so as to cause the mercury of two or more of the lower electrodes to flow together and then separate, thus making and then breaking a metallic connection between the cathode 8 and one or both of the supplemental anodes 13 and 14. Current then flows first through the metallic connection and then when the connection is broken through the arcs then produced. Although the anodes are connected to the mains of the source of supply, current will flow from these mains to the anodes only when it is of such direction as to pass from the respective anodes to the cathode 8. Current, therefore, flows alternately through the two supplemental anodes to the cathode. At the time that the alternating wave of current supplied from the source is passing through zero there is no current passing in the envelop. If supplemental means were not provided to prevent it, the vapor-emitting action of the cathode 8 would therefore cease as soon as one wave of current reached zero and current had failed to rise in the opposite direction. The inductance-coils 11 and 12, however, store energy during the time current is flowing from the source to the anodes and discharge this energy in such a manner as to cause the current from the anodes to flow in the envelop after the wave of current has ceased flowing from the source. Current, therefore, flows continuously from each anode to the cathode, though varying in value, and thus maintains the cathode in a state of constant excitation. The arcs between the anodes and the cathodes consequently mutually sustain each other, and there thus follows a flow of current in the lead 9, due to a combination of the currents flowing into the envelop through the anodes 13 and 14. After the apparatus has been set into operation the switches 15 and 16 may be opened, thus causing the arcs from the anodes 13 and 14 to be transferred to the main anodes 6 and 7. During normal operation, as well as during starting, the consumption-circuit 17 18 receives a current of a frequency which is double that supplied to the apparatus as a whole. The operations whereby this result is produced will be made clear by reference to the arrows representing the directions of flow of currents in their respective circuits. Current flowing to either set of anodes is always in the direction represented by the arrows 23 and 24, while that from the cathode 8 is always in the direction indicated by the arrow 25. The path of a positive-current wave—say from the lead 3—passes first to the anode 7, then to the cathode 8, thence to the junction 10, where it divides, part flowing through the circuit 17 18 and part through the inductance-coil 12 to the lead 4. The arrow 26 indicates the direction of this current-wave through the inductance-coil 12. As this wave rises in value the inductance-coil stores energy, and when the wave reaches its maximum and commences to fall the inductance-coil commences to discharge. This discharge produces a flow of current in the same direction as and tending to prevent the fall of the current-wave which stores the energy in the coil. This discharge, it will be noted, has two paths in which it may flow and between which it divides. One of the paths is from the inductance-coil 12 to the anode 6 and then through the arc in the envelop 22 back to the opposite end of the coil at 10. The other path of discharge is through the main 4 in the direction of the arrow 27, then through the first half of the secondary 2, and then through the consumption-circuit 17 18 back again to the junction 10. As I have already described, the flow of current directly from the source upon which is superposed the discharges due to the inductance-coils is such that current after flowing through the envelop 22 passes from the cathode 8 through the lead 9 and then divides, part going through one or the other of the inductance-coils, as the case may be, and the other part in the direction of the arrow 29, through the consumption-circuit 17 18 to the junction with the middle point of the secondary 2. Now it will be noticed that the discharge from the inductance-coils, or either of them, in the circuit going to the cathode 8 is always in the same direction as the current flowing in this circuit directly from the source. The effect of the inductance-coils in the circuit of the cathode 8 is therefore to fill up the gaps in the unidirectional current-waves, and thus tends to produce a more or less even direct current. In the consumption-circuit 17 and 18, however, the direction of discharge from the inductance-coils, or either of them, is in a direction opposite that of the current flowing in this circuit directly from the source. Instead, therefore, of filling up the gaps or depressions in the current-waves in this circuit the inductance-coils deepen the depressions, so to speak, and cause them to extend across the neutral line of current and so produce an alternating current. Where a single half wave or pulsation before existed, a complete wave or alternation now exists. In other words, a double-frequency current has been produced. Under ordinary circumstances, however, the double-frequency current is of such nature that the waves of one polarity are of greater amplitude than those of opposite polarity. Because of the less obstruction to current-flow those waves, due to the direct flow of current from the source, are ordinarily of greater amplitude than the waves of opposite polarity produced by the discharge of the inductance-coils. To overcome this objection and make the waves symmetrical, I modify the apparatus shown in Fig. 1 in the manner represented in Fig. 2. This figure is in all respects like Fig. 1, except that four inductance-coils 30, 31, 32, and 33, with a resistance 34 between their respective junction-points, are employed instead of two coils, as in Fig. 1. No further description, therefore, of Fig. 2 is deemed necessary beyond that required to set forth the functions of the additional inductance-coils and the resistance. The inductance-coils 30 to 33, inclusive, are connected in pairs across the supply-main 35 and 36, leading from the secondary 37. The resistance 34 is connected between the junctions of the coils of each pair, as indicated. The resistance 34 causes the proportion of current due to the discharge of inductance-coils 30 and 31 to be greater through the consumption-circuit 38 than through the vapor-conductor. At the same time the resistance reduces somewhat the flow of current from the mains 35 and 36, through the vapor-conductor and the lead 39, to the consumption-circuit 38. The dissymmetry of the double-frequency current which is produced in an apparatus, such as shown in Fig. 1, is in the arrangement shown in Fig. 2 entirely obviated and a smooth and even double-frequency current secured.

Though I have described certain embodiments of my invention and set forth the manner in which it may be carried out in practice, I do not wish to be limited to the details shown and described, since numerous variations thereof may be made without departing from the spirit thereof.

What I claim as new, and desire to secure by Letters Patent of the United States, is—

1. The combination of a source of alternating current of given frequency, an energy-storing device or devices, a vapor-conductor, and means controlled by the vapor-conductor for producing a double-frequency current from the current derived from such source.

2. The combination of a vapor-conductor, a source of alternating current, an energy-storing device or devices, and connections for combining waves from said source with waves due to discharges from said device or devices such as to produce a current the frequency of which differs from that of said source.

3. The combination of a source of alternating current, a consumption-circuit, a vapor-conductor, and one or more inductance-coils connected so as to receive current from said source and so as to have discharge-paths, one through the vapor-conductor and another through said consumption-circuit.

4. The combination of a source of alternating current, a consumption-circuit, means for causing successive waves from said source to be passed in a unidirectional manner through said consumption-circuit, and means for combining with said waves additional waves such as to cause a resulting current of a frequency double that of the original supply-current.

5. The combination of a source of alternating current, a consumption-circuit, a current-selective device for causing waves from said source to pass unidirectionally through said consumption-circuit, and means for superposing upon said consumption-circuit additional waves such as produce a resulting double-frequency current.

6. The combination of a source of alternating current, means extending therefrom, energy storing and restoring devices in series across said mains, a vapor-conductor having a plurality of electrodes two of which are connected respectively to said mains and a third to the junction between said devices, and a consumption-circuit connected between said junction and a point of intermediate potential on said source.

7. The combination of a vapor-conductor, a source of alternating current, an energy-storing device or devices, and connections for combining waves from said source with waves due to discharges from said device or devices such as to produce a current the frequency of which differs from that of said source, and means for equalizing the amplitudes of the opposite polarity waves of the changed frequency-current.

8. The combination of a source of alternating current of a given frequency, a vapor electric device, and means coöperating with said device for producing an alternating current of a frequency different from that of the source.

In witness whereof I have hereunto set my hand this 10th day of December, 1903.

OSIAS O. KRUH.

Witnesses:
 BENJAMIN B. HULL,
 HELEN ORFORD.